Patented July 20, 1954

2,684,342

UNITED STATES PATENT OFFICE 2,684,342

ADHESIVE AND GROUTING MATERIAL

Lewis W. Eckert, Lancaster Township, Lancaster County, Pa., assignor to Armstrong Cork Company, Lancaster, Pa., a corporation of Pennsylvania No Drawing. Application June 22, 1949, Serial No. 100,759

8 Claims. (Cl. 260—8)

This invention relates to a combination adhesive and grouting material and more particularly to a ready-mixed composition suitable for use in the application of wall tile to a base.

It has been common practice in the erection of metal and plastic wall tile to use a standard commercial adhesive to secure the tile to the base and to use a grouting material which is supplied in dry form and mixed with water to form a paste at the time the installation is made. Most of the dry grouting materials supplied require a specific amount of water in order to obtain the proper consistency of the grouting material so that it can be easily worked into the grooves between the tile. If the proportion of water to dry material is not carefully measured, the grout is not easily worked into the joints between the tile and does not stand up satisfactorily. If the water content of the mixture is too low, the material has a tendency to crumble and cannot be properly worked into the joints. If the mixture contains too much water, it has a tendency to run in the joints, and upon drying it shrinks excessively, causing cracks on the surface and also causing the grouting material to pull away from the tile. These cracks on the surface and open joints allow water to penetrate into the grouting material and leach certain of the filler components from the material. After a while the material crumbles and falls out, making replacement necessary.

In order to overcome the disadvantages of the conventional grouting material recited above, I have developed a premixed material which can be used both as an adhesive for securing the tile to the base and as a grouting material to point the tile after it has been secured to the base. This material is mixed at the factory in the proper proportions and, therefore, is always of the proper consistency to give optimum results. The material described herein may be used as a grouting for pointing new tile installations, or it may be used for pointing installations which have been in use for some time and which need repointing.

An object of this invention is to provide a material which may be used as a combination adhesive and grouting material in tile installations.

Another object of this invention is to provide a grouting material which is premixed and, therefore, always of the proper consistency for use.

A further object of this invention is to provide a combination adhesive and grouting material which has a low shrinkage factor and a low water absorption factor.

It has been found through extensive research that a water emulsion of a resin to form the binder for a material of this type produces the most satisfactory grout. Any of the inherently hard resins are satisfactory for this purpose such as the hard coumarone-indene, terpene, and pinene resins having a melting point of 150° F. or above. It will be understood, of course, that that instead of a true solution a partial solution may be prepared and satisfactorily worked into the emulsion. It will be understood, of course, that the proper resin will have to be selected to produce a grouting material having the desired color. Certain other resins such as the oxidizable alkyd resins are also suitable.

In the formation of a grout of this type a resin phase and a water phase are produced. The resin phase is made by dissolving the resin in a suitable solvent. To this solution is added a small amount of material which readily combines with a volatile alkali to form a soap-type emulsifying agent. This soap-forming reaction may take place at the time the emulsion is formed.

The water phase is produced by preparing a solution of suitable stabilizers, preservatives, and other materials necessary to give the final product its desirable workability characteristics.

The emulsion is then formed from the above prepared resin phase and water phase. The water phase carrying the stabilizers, preservatives, and other necessary ingredients is placed in a mixer and the volatile alkali is added during rapid agitation. The resin phase is then added slowly in a steady stream and the mixture agitated until thoroughly blended. During the addition of the resin phase to the water phase and volatile alkali, the volatile alkali combines with the soap-forming constituent of the resin phase, forming a soap-type emulsifying agent for the resin. After this has been accomplished the emulsion is passed through a screen of suitable fineness and then through a colloid mill set at about .010 inch.

In the compounding of the combination adhesive and grouting material the proper filler materials are added to the emulsion to produce a relatively stiff plastic composition having the desired viscosity and other characteristics necessary for a material of this type.

Experimentation has shown that in the preparation of this grout the resinous binder material should be present in a range of between 1 part of binder material for 4 parts of filler and 1 part of binder material for 8 parts of filler, with the preferred ratio being 1 part binder material for 6 parts of filler. The range of emulsion to filler may vary from 1 part of emulsion for 1.32 parts of filler to 1 part emulsion for 3 parts of filler. The ratio of emulsion to filler depends to a large extent on the type of filler material used. In order to produce a grouting material of the desired consistency, the water content should fall within the range of from 8% to 14%. In the preferred embodiment the water content is approximately 12%.

Typical examples of combination prepackaged grouting and adhesive materials are set forth in the following formulations, all percentages being by weight:

Example I

| Resin phase: | Per cent |
|---|---|
| Cumarone-indene resin | 65.42 |
| Xylol | 28.03 |
| Oleic acid (a fatty acid) | 6.55 |
| Water phase: | |
| "Carbowax" (polyethylene glycol) | 5.00 |
| Casein | 2.5 |
| Morpholine | .5 |
| "Dowicide A" (sodium pentachlorophenol) | .13 |
| Water | 91.87 |
| Emulsion: | |
| Water phase | 39.1 |
| Morpholine (volatile alkali) | 1.17 |
| Resin phase | 59.73 |
| Grout: | |
| Emulsion prepared as above | 30.2 |
| "Cryptone" (zinc sulphide) | 13.95 |
| Sierra talc (fibrous talc) | 27.90 |
| 120 mesh silica | 22.55 |
| Kingsley clay (Georgia kaolin) | 5.4 |

Example II

| Resin phase: | Per cent |
|---|---|
| Terpene resin | 65.42 |
| Xylol | 28.03 |
| Oleic acid (a fatty acid) | 6.55 |
| Water phase: | |
| "Carbowax" (polyethylene glycol) | 5.00 |
| Casein | 2.5 |
| Morpholine | .5 |
| "Dowicide A" (sodium pentachlorophenol) | .13 |
| Water | 91.87 |
| Emulsion: | |
| Water phase | 39.1 |
| Morpholine (emulsifying agent) | 1.17 |
| Resin phase | 59.73 |
| Grout: | |
| Emulsion prepared as above | 30.1 |
| "Cryptone" (zinc sulphide) | 13.95 |
| Sierra talc (fibrous talc) | 27.90 |
| 120 mesh silica | 22.57 |
| Kingsley clay (Georgia kaolin) | 5.4 |

Example III

| Resin phase: | Per cent |
|---|---|
| Pinene resin | 65.42 |
| Xylol | 28.03 |
| Oleic acid (a fatty acid) | 6.55 |
| Water phase: | |
| "Carbowax" (polyethylene glycol) | 5.00 |
| Casein | 2.5 |
| Morpholine | .5 |
| "Dowicide A" (sodium pentachlorophenol) | .13 |
| Water | 91.87 |
| Emulsion: | |
| Water phase | 39.1 |
| Morpholine (emulsifying agent) | 1.17 |
| Resin phase | 59.73 |
| Grout: | |
| Emulsion prepared as above | 30.1 |
| "Cryptone" (zinc sulphide) | 13.95 |
| Sierra talc (fibrous talc) | 27.90 |
| 120 mesh silica | 22.57 |
| Kingsley clay (Georgia kaolin) | 5.4 |

Example IV

| Resin phase: | Per cent |
|---|---|
| Coumarone-indene resin | 65.42 |
| Xylol | 28.03 |
| Oleic acid (a fatty acid) | 6.55 |
| Water phase: | |
| "Carbowax" (polyethylene glycol) | 5.00 |
| Casein | 2.5 |
| Ammonium hydroxide (26° Bé) | .5 |
| "Dowicide A" (sodium pentachlorophenol) | .13 |
| Water | 91.87 |
| Emulsion: | |
| Water phase | 39.1 |
| Ammonium hydroxide (26° Bé) (emulsifying agent) | 1.17 |
| Resin phase | 59.73 |
| Grout: | |
| Emulsion prepared as above | 30.1 |
| "Cryptone" (zinc sulphide) | 13.95 |
| Sierra talc (fibrous talc) | 27.90 |
| 120 mesh silica | 22.57 |
| Kingsley clay (Georgia kaolin) | 5.4 |

The grouts set forth in the foregoing examples are all prepared as described earlier.

In the formulations given above the coumarone-indene, terpene, and pinene resins serve as the binder for the filler materials in forming the finished grout. The xylol serves as the solvent for the resinous material. Any suitable solvent for the resin chosen may be used satisfactorily so long as it is a volatile solvent, which upon evaporation leaves the hard resinous material. The oleic acid added to the resin phase helps to dissolve the resin and also combines with the volatile alkali to form a soap.

In the formation of the water phase certain ingredients are added to stabilize the emulsion and also preserve the resin as well as to render certain essential characteristics to the finished product such as spreadability, adhesive properties, etc. The casein is present for its adhesive properties in rendering initial tack to the material. The casein also serves as a stabilizer for the resin. The "Carbowax" is a polyethylene glycol material which improves the spreadability of the finished grouting material. This material retards the setting, thereby enabling the workman to properly place the tile and remove the excess material from the joints before the material has set. The morpholine added to the water phase serves as a solvent agent for the casein. The "Dowicide A" (sodium pentachlorophenol) serves as a preservative for the casein. In place of the stabilizers and preservatives set forth in the examples given, any of the well-known stabilizers for the particular resin may be employed satisfactorily. In place of the "Carbowax" glycerine or ethylene glycol may be used to retard the setting of the material.

In the formation of the emulsion, morpholine is added to the water phase to combine with the oleic acid of the resin phase to form the emulsifying agent for the resin. In place of morpholine any volatile alkali may be used such, for example, as the ammonium hydroxide shown in Example IV.

The filler materials may be altered to suit the desired spreadability and workability characteristics.

"Cryptone" is a zinc sulphide pigment which may be replaced by any suitable pigments such as titanium dioxide, etc. Sierra talc is a fibrous talc which may be replaced by any fine fibrous filler material such as asbestine, etc. The silica may range in size from 50 mesh to 325 mesh. The Kingsley clay is a Georgia kaolin clay which may be substituted by any fine coating clay.

The grouts formed in accordance with Examples I, II, III, and IV above set up to desired hardness in a period of approximately 48 hours. The physical characteristics of the four examples are practically the same. Taking Example I as typical, it has been found to have a shrinkage of about 1.35% which is relatively low in comparison to the grouting materials used commercially. The adhesive characteristics are excellent. A test was made by adhering a 4½" x 4½" metal tile to a surface by means of the adhesive prepared in accordance with Example I. The adhesive was allowed to set 3 minutes and then a tensile load was applied to the face of the tile to determine the weight required to pull the same loose from the foundation. This test revealed that a force of 9.68 pounds was required to remove the tile or .478 pound per square inch. A similar test was run in which the adhesive was allowed to set for five days. In this case in order to remove the 4½" x 4½" tile a force of approximately 100 pounds was required to break the bond between the tile and the foundation or 4.9 pounds per square inch.

The water absorption of the grouting material was tested by applying the grout to the back of a tile and allowing this to dry for various periods of time, after which the tile was immersed in water for two hours and the absorption measured. This test showed the following results:

| Drying Time Before Immersion | Percentage of Absorption by Weight |
| --- | --- |
| 24 hours | 5.28 |
| 7 days | 2.00 |
| 10 days | 1.46 |
| 26 days | 0.36 |

It will be obvious from the results of these tests that after this material is allowed to dry thoroughly the water absorption is negligible.

Shrinkage measurements were made by troweling a rectangularly shaped slab of grout by means of a template on a sheet of cellophane lying loosely on a supporting plate. The distance between two points approximately eight inches apart was measured to the nearest 1/64 of an inch, and the same dried in a cabinet for 72 hours at 120° F. The sample was allowed to cool, and the distance between these points again measured. The shrinkage was calculated on the basis of the length of the original line between the marked points and the length of the line between the marked points after the grout had been subjected to 120° F. for 72 hours. The results of this test indicated that the grouting material had a shrinkage of 1.35%.

The combination adhesive and grouting material manufactured in accordance with the teaching of this application is premixed in the factory and is packaged in such a manner that it will always be of the same consistency when used in the installation. The material has good adhesive characteristics; and it does not set up readily, allowing the installation men sufficient time to properly place the tile in the adhesive and remove the excess grouting material from the line between the tile. The material has excellent water resistance and a very low coefficient of shrinkage, all of which are very desirable characteristics for a material of this type.

In the erection of wall tile using this combination material, the adhesive is applied to the base in a smooth, uniform coating. The tile are then placed on the material with a sliding action to extrude a small amount of the plastic adhesive material between the adjacent tile. After the tile have been so placed, the excess material is removed by means of a water-soaked sponge and the joint is smoothed by means of the workman's finger to give a smooth, uniform appearance to the surface of the tile. In the event the grouting material becomes set on the surface of the tile, it may easily be removed by means of steel wool.

While I have illustrated and described certain preferred embodiments of my invention, it will be understood that the same is not so limited but may be otherwise practiced within the scope of the following claims.

I claim:

1. A combination ready-mixed adhesive and grouting material comprising a binder of an aqueous emulsion of coumarone-indene resin having a melting point of not less than 150° F. dissolved in a solvent, oleic acid, and a volatile alkali, and an inorganic filler material, the ratio of inorganic filler material with respect to binder material being about 6 parts by weight of filler to 1 part by weight of binder, the water content of the finished product being about 12% by weight.

2. A combination ready-mixed adhesive and grouting material comprising a binder of an aqueous emulsion of a coumarone-indene resin having a melting point of not less than 150° F. dissolved in a solvent, oleic acid, and a volatile alkali, and an inorganic filler material, the range of inorganic filler material and binder being between 4 parts by weight of filler to 1 part by weight of binder and 8 parts by weight of filler to 1 part by weight of binder, the water content of the finished product being from 8% to 14% by weight.

3. A combination ready-mixed adhesive and grouting material in accordance with claim 2 in which the volatile alkali is morpholine.

4. A combination ready-mixed adhesive and grouting material in accordance with claim 2 in which the emulsifying agent is ammonium hydroxide.

5. A combination ready-mixed adhesive and grouting material comprising a binder of an aqueous emulsion of a coumarone-indene resin having a melting point of not less than 150° F. dissolved in a solvent, oleic acid, and a volatile alkali, and an inorganic filler material, the range of inorganic material to binder being between 4 parts by weight of filler to 1 part by weight of binder and 8 parts by weight of filler to 1 part by weight of binder.

6. A combination ready-mixed adhesive and grouting material comprising a binder of an aqueous emulsion of a coumarone-indene resin having a melting point of not less than 150° F. dissolved in a solvent, oleic acid, a volatile alkali, and a minor amount of casein, and an inorganic filler material, the range of an inorganic filler material and binder being between 4 parts by weight of filler to 1 part by weight of binder and 8 parts by weight of filler to 1 part by weight of binder.

7. A combination ready-mixed adhesive and grouting material comprising a binder of an aqueous emulsion of a coumarone-indene resin having a melting point of not less than 150° F. dissolved in a solvent, oleic acid, a volatile alkali, and a minor amount of polyethylene glycol, and an inorganic filler material, the range of inorganic filler material and binder being between 4 parts by weight of filler to 1 part by weight of binder and 8 parts by weight of filler to 1 part by weight of binder.

8. A combination ready-mixed adhesive and grouting material comprising a binder of an aqueous emulsion of a coumarone-indene resin having a melting point of not less than 150° F. dissolved in a solvent, oleic acid, a volatile alkali, a minor amount of casein, and a minor amount of polyethylene glycol, and an inorganic filler material, the range of inorganic filler material and binder being between 4 parts by weight of filler to 1 part by weight of binder and 8 parts by weight of filler to 1 part by weight of binder.

References Cited in the file of this patent

UNITED STATES PATENTS

| Number | Name | Date |
|---|---|---|
| 2,037,913 | Madenwald et al. | Apr. 21, 1936 |
| 2,051,409 | Kenney | Aug. 18, 1936 |
| 2,077,094 | Byers | Apr. 13, 1937 |
| 2,198,596 | Atwood | Apr. 30, 1940 |
| 2,245,100 | Bernstein | June 10, 1941 |
| 2,396,607 | Rogers | Mar. 12, 1946 |
| 2,441,101 | Matthews | May 4, 1948 |
| 2,486,756 | Murphy | Nov. 1, 1949 |

OTHER REFERENCES

Wakeman: The Chemistry of Commercial Plastics, Reinhold, 1947, page 425.

"Synthetic Organic Chemicals," Carbide and Carbon Chemical Corporation publication, 10th ed., October 15, 1940, pp. 66–68.